S. S. SPIRE.
SULKY PLOW.
APPLICATION FILED NOV. 28, 1919.
1,387,810.
Patented Aug. 16, 1921.
3 SHEETS—SHEET 3.
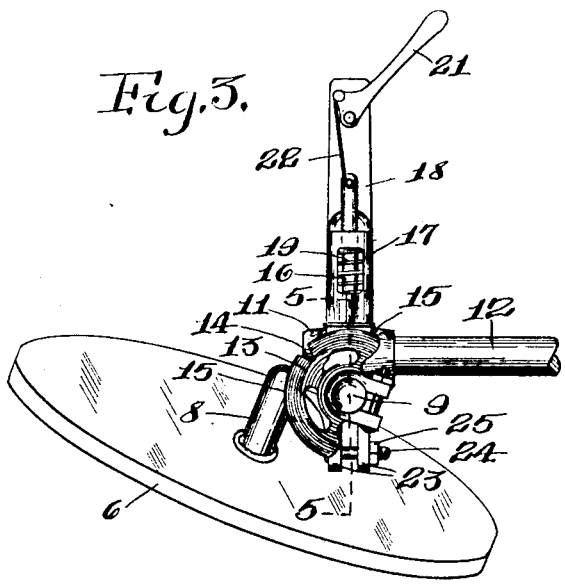
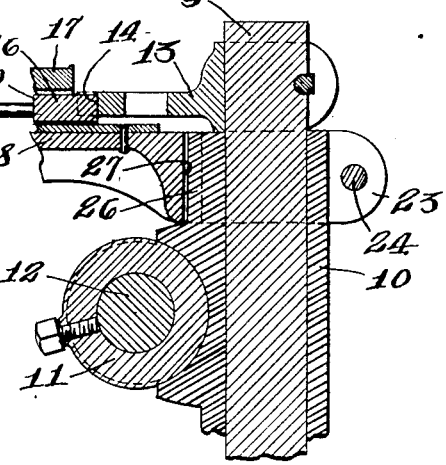
WITNESS:
INVENTOR.
Sheldon S. Spire.
BY
Parsons & Bidell.
ATTORNEYS.

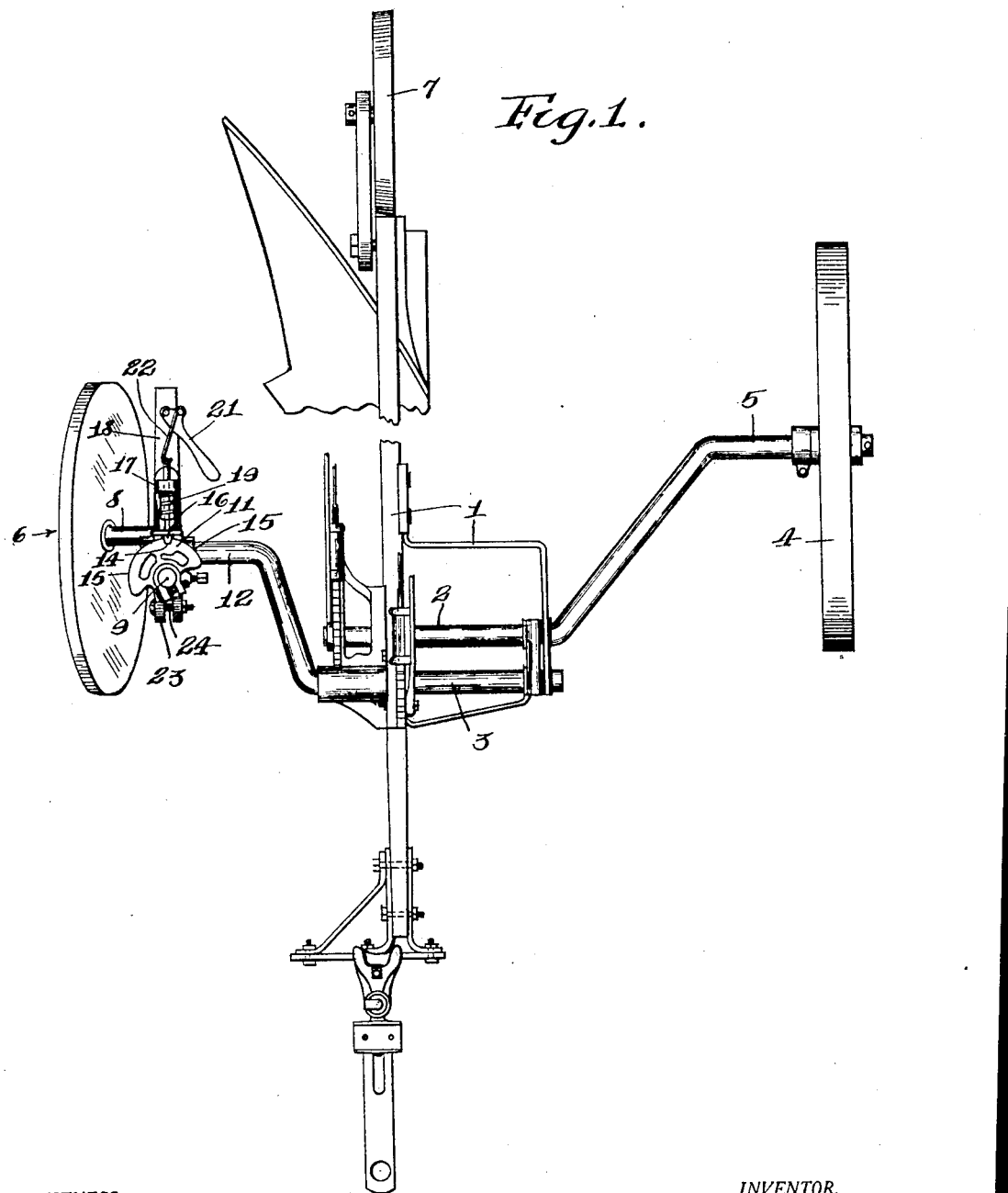

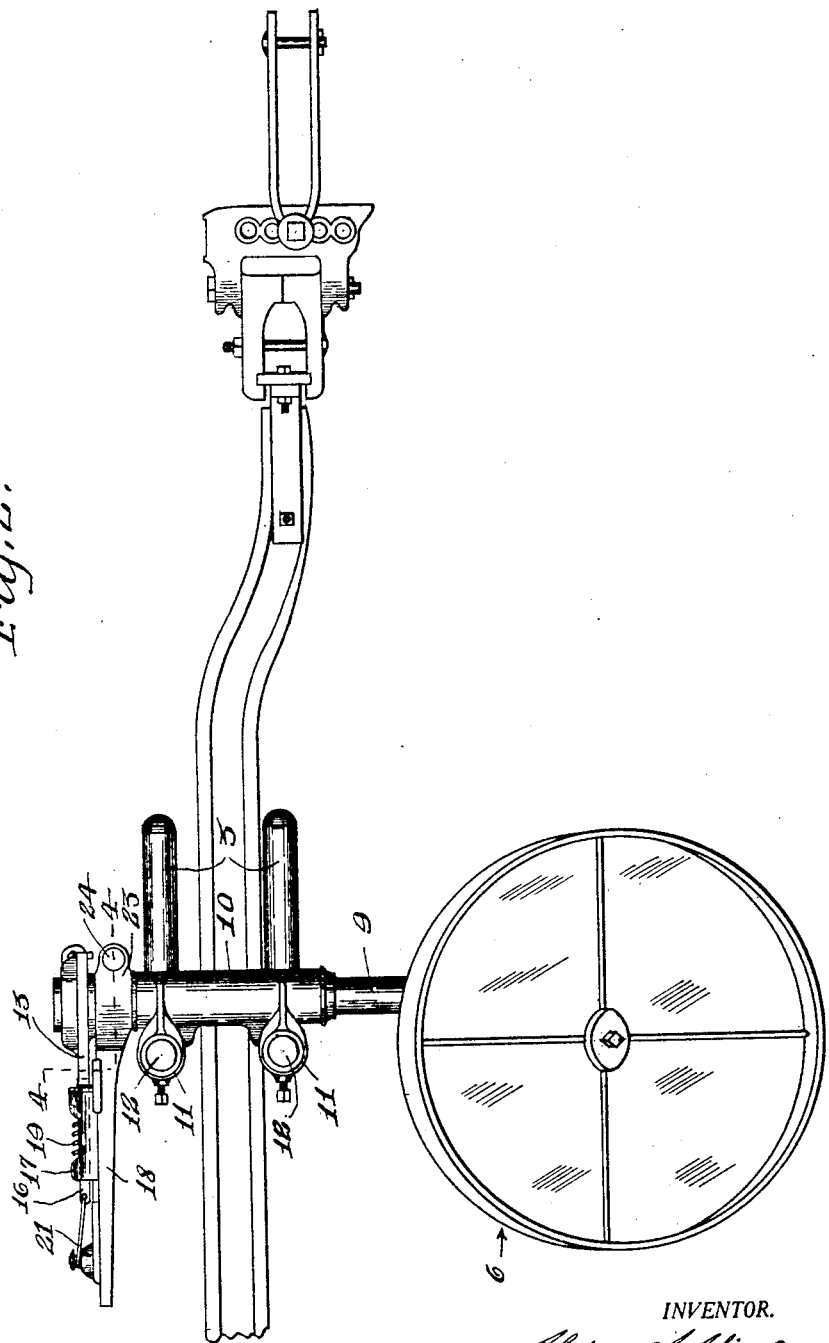

UNITED STATES PATENT OFFICE.

SHELDON S. SPIRE, OF SYRACUSE, NEW YORK, ASSIGNOR TO SYRACUSE CHILLED PLOW COMPANY, OF SYRACUSE, NEW YORK, A CORPORATION OF NEW YORK.

SULKY-PLOW.

1,387,810.

Specification of Letters Patent. Patented Aug. 16, 1921.

Application filed November 28, 1919. Serial No. 341,072.

*To all whom it may concern:*

Be it known that I, SHELDON S. SPIRE, a citizen of the United States, and a resident of Syracuse, in the county of Onondaga and State of New York, have invented a certain new and useful Sulky-Plow, of which the following is a specification.

This invention relates to sulky plows and has for its object a particularly simple and efficient means for controlling the castering of the caster or furrow wheel including a handle which does not change its position relatively to the operator during castering of the wheel.

The invention consists in the novel features and in the combinations and constructions hereinafter set forth and claimed.

In the drawings:—

Figure 1 is a plan view of a sulky plow embodying my invention, parts being omitted.

Fig. 2 is a fragmentary side elevation thereof.

Fig. 3 is a detail plan view of the caster wheel, the same being shown as castering in one direction.

Fig. 4 is an enlarged sectional view on line 4—4, Fig. 2.

Fig. 5 is an enlarged sectional view on line 5—5, Fig. 3.

This sulky plow may be of any suitable form, size and construction and as here shown comprises a frame 1 having suitable bearings for crank axles 2, 3, there being two axles 3 one directly above and in parallelism with the other.

4 is a ground wheel mounted on the spindle 5 at the outer end of the axle 2.

6 is the caster or furrow wheel. 7 is the rear wheel.

The caster wheel 6 is mounted upon a suitable axle having a spindle portion 8 on which the caster wheel rotates and an upwardly extending portion 9 journaled or swiveled in an upright bearing 10. This bearing 10 also has transversely extending horizontal bearings 11 for the spindles 12 at the outer ends of the axles 3.

The means for controlling the castering of the wheel 6 as here shown comprises a member or sector 13 mounted on the upper end of the portion 9 of the caster wheel axle, and means coacting with the sector 13 to normally hold the caster wheel in a predetermined position usually in a straight position or parallel with the line of draft, said means being normally fixed from lateral swinging movement as the caster wheel swivels. As here shown, the sector 13 is formed with a single notch 14 and with plane faces 15 on opposite sides of the notch, said faces being here shown as concentric with the axis of the upright portion 9 of the caster wheel axle. The means for coacting with this sector comprises a spring pressed pawl 16 fixed from turning movement with the sector 13 and movable into the notch 14 and engaging one or the other of the plane faces 15 after it has been withdrawn from the notch and the caster wheel is swiveling in one direction or the other.

As here shown, the spring pressed pawl 16 is movable in a suitable guide or barrel 17 mounted upon a support or bracket 18, the spring 19 being located in the barrel 17 and encircling the stem of the pawl and pressing in one direction on a collar 20 on the pawl and at its other end against the rear end of the barrel. The pawl is moved against the action of its spring by means of a hand lever 21 pivoted to said support 18 and connected to the rear end of the stem of the pawl by a link 22.

The support 18 on which the barrel 17 and lever 21 are mounted as here shown comprises a bracket mounted on the upper end of the bearing 10, it being here shown as having a split bearing 23 which is clamped onto the bearing 10 by means of a bolt and nut 24, 25. The bracket can therefore be adjusted into different radial positions relatively to the axis of the bearing 10 and hence shift the pawl 16 so that the caster wheel must assume a predetermined angle before the notch 14 registers with the pawl. By reason of this adjustment, the normal position of the caster wheel can be varied to suit conditions as will be understood by those skilled in the art. For instance hillside plowing requires different normal position of the caster wheel from level ground plowing. The adjustment of the support is limited by a tongue 26 on the bearing 10 and extending into an elongated recess 27 in the split bearing 23.

When it is desired to turn the plow in one direction or the other, in order to facilitate the turning thereof, the operator pulls on the handle 21 and withdraws the pawl 16 from the notch 14 and when the wheel casters slightly the pawl rides on one or the other of the surfaces 15.

When the plow has been turned to the desired position and is proceeding in a straight line the caster wheel turns back to its normal position and the spring pressed pawl automatically latches in the notch and holds the caster wheel from further castering. The handle controlling the castering is always within the same distance from the seat, as it does not swing as the caster wheel swivels.

What I claim is:

In a sulky plow, the combination of a caster wheel at one side thereof, an axle on which the caster wheel is mounted having an upwardly extending portion, a bearing in which the upwardly extending portion is journaled, a support mounted on the bearing and having clamping means by which it is secured to the bearing, the support being adjustable to different radial positions about the bearing, a sector mounted upon the upper end of said portion of the axle and overlying the said support, the sector having a notch and plane faces on opposite sides of the notch, a spring pressed pawl mounted on the support and coacting with the sector and movable into the notch thereof, and a handle mounted on said support and connected to the pawl to withdraw the same against the action of its spring, substantially as and for the purpose described.

In testimony whereof, I have hereunto signed my name, at Syracuse, in the county of Onondaga, and State of New York, this 17th day of November, 1919.

SHELDON S. SPIRE.